July 21, 1936.　　　　L. A. PAINE　　　　2,048,618
RECORDING ELECTRIC METER
Filed Feb. 15, 1932　　　2 Sheets-Sheet 1

Inventor.
Louis A. Paine.

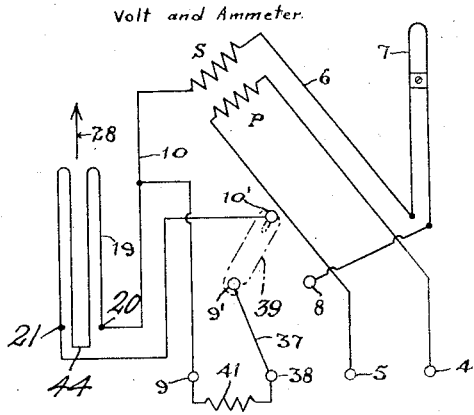
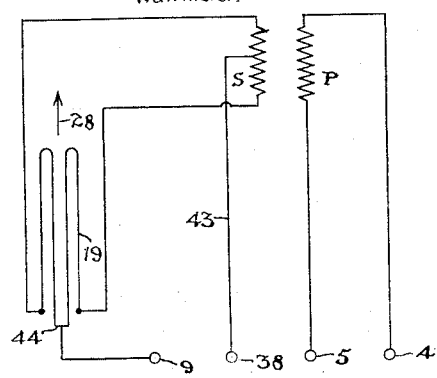
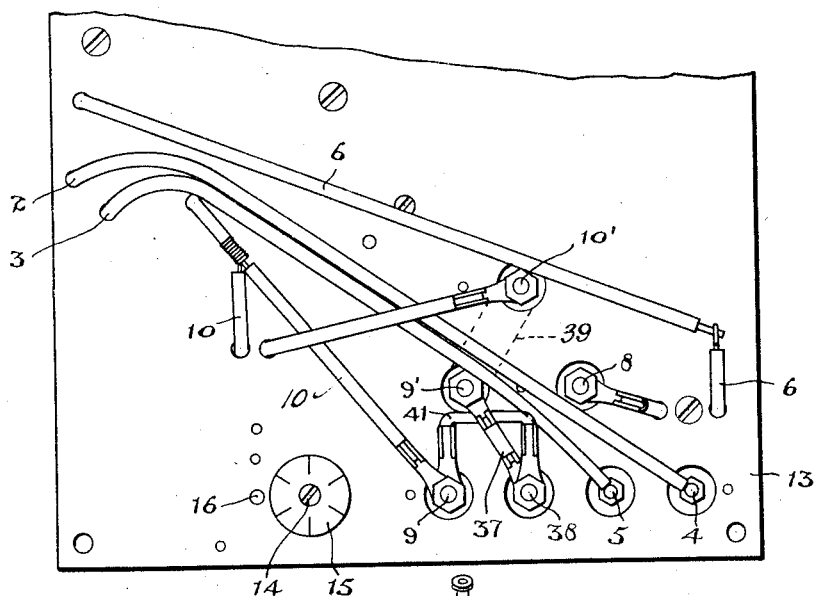
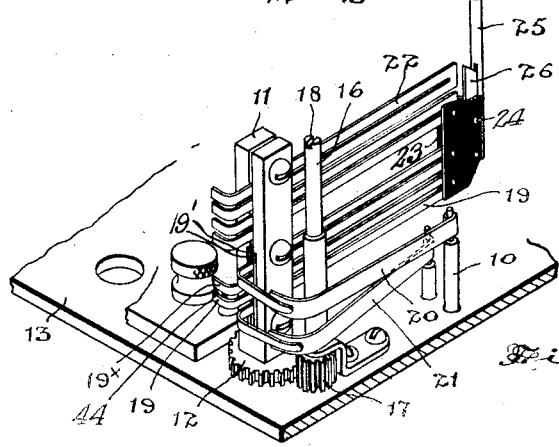

Patented July 21, 1936

2,048,618

UNITED STATES PATENT OFFICE 2,048,618

RECORDING ELECTRIC METER

Louis A. Paine, Toronto, Ontario, Canada, assignor to Lincoln Meter Company Inc., Springfield, Ill.

Application February 15, 1932, Serial No. 593,168

7 Claims. (Cl. 171—34)

The principal objects of this invention are, to simplify the construction of electric meters, thereby effectively reducing the cost, and to devise a rugged form of structure particularly adapted to graphic meters which will be extremely accurate, but will not be supersensitive and will therefore produce a very readily readable chart.

The principal features of the invention consist in the novel construction and arrangement of a bi-metallic resistance element mounted in close thermal association with an equalizing element and directly operating a graphic marker.

A further important feature consists in the novel arrangement of the connecting terminals, whereby the function of the device may be readily shifted from that of an ammeter to that of a volt meter.

A still further important feature consists in the novel method of mounting the thermal elements, whereby adjustment of the recording element may be effected in a very simple manner.

In the accompanying drawings, Figure 1 is a plan view of a meter constructed in accordance with this invention.

Figure 3 is an underside plan view showing the arrangement of the wiring.

Figure 4 is a perspective detail of the operating element of the meter, part thereof being broken away.

Figure 5 is a diagram of the wiring for the use of the meter as a volt meter or ammeter.

Figure 6 is a diagram of the arrangement of the wiring for a watt meter.

Figure 1:
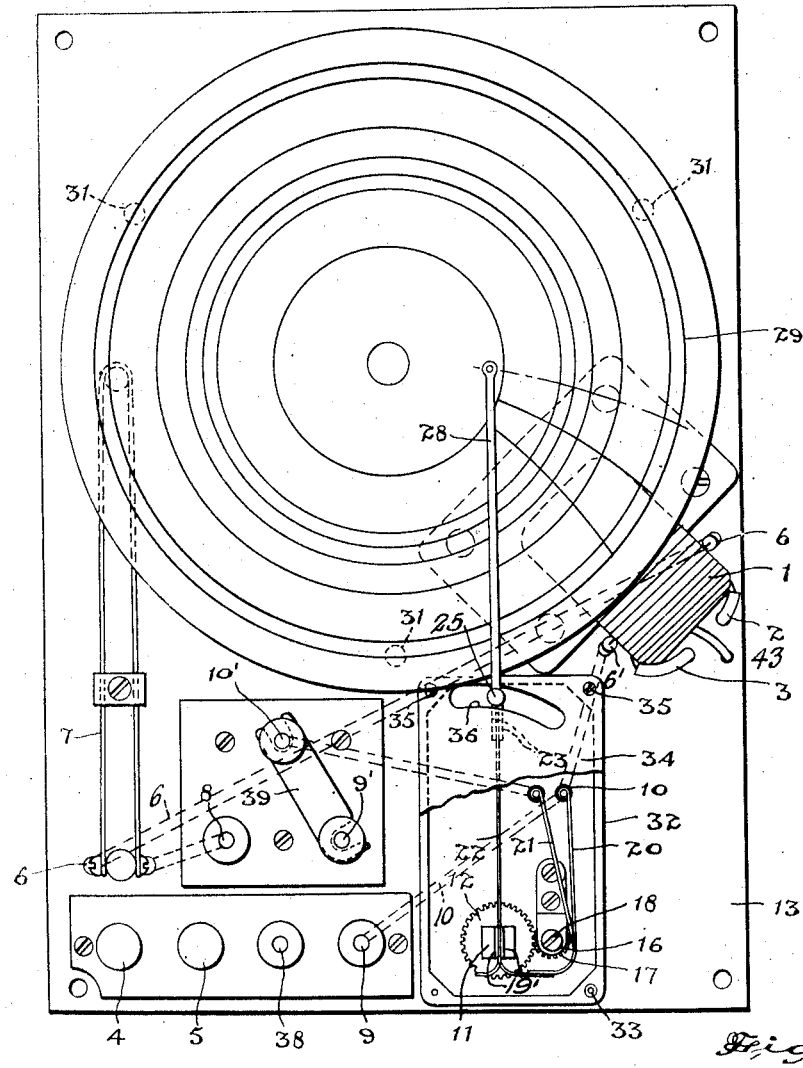
Figure 2:
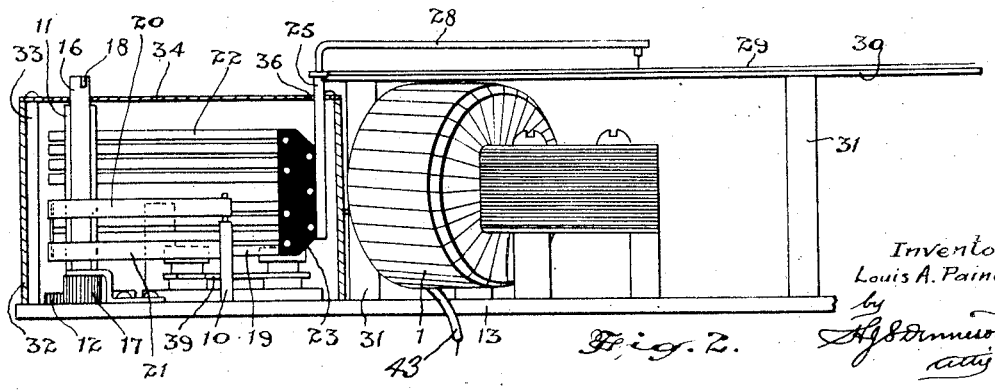
Figure 2 is a side elevational view of the meter taken from the right side of Figure 1 with the casing enclosing the metering element removed.

In the construction herein shown the transformer 1 has its primary windings connected by the leads 2 and 3 to the posts 4 and 5 respectively.

The secondary coil S of the transformer Figure 5 has one lead 6 connected to one terminal of the adjustable resistance 7, the other terminal of which resistance is connected to the binding post 8. The other terminal 6' of the transformer secondary winding is connected with a binding post 9 through a portion of a branch 10 which branch includes the flexible conducting strips 20 and 21 and is connected to the binding post 10' in series with the meter-operating element 19 later to be described and as illustrated diagrammatically in Figure 5.

A post 11 is rigidly mounted upon a spur gear 12 which has a spindle extension journalled in the base 13 and is secured by a screw 14 engaging a spring washer 15 which bears against the underside of the base to hold the post in adjusted positions.

A spindle 16 is rotatably mounted in the base 13 adjacent to the spur gear 12 and has mounted thereon a spur pinion 17 meshing with the spur gear.

The upper end of the spindle is formed with a slot 18 which is adapted to receive the end of a screw driver by means of which the spindle may be turned to rotatably adjust the position of the spur gear and post 11 to set the meter to a zero position as will hereinafter appear.

The post 11 is split vertically and between the divided portions thereof adjacent to the bottom are placed the fingers of a thermal electrical resistance element 19 which are electrically insulated from the post. This element is formed of a plurality of thin flexible bi-metallic strips which are connected together in pairs at one end and the element 19 here shown, which is formed of two pairs has the adjacent ends 19' and 19× electrically connected together at 44.

The other ends of the outside pair of resistance elements are connected respectively to the flexible conductor strips or terminals 20 and 21 forming part of the branch lead 10 of the secondary circuit of the transformer. The current thus flows in series through the four fingers or strips of the resistance element 19. These fingers are of bi-metallic construction and the resistance to the flow of current is such as to establish a temperature within the element causing the same to flex in proportion to the heat generated by the flow of current.

In order to equalize or offset the effect of changes in ambient temperature in the atmosphere surrounding the thermal element, which would tend to flex the element 19 to a greater or less degree independent of the electrical influence applied thereto, an element 22 similar to the element 19 is secured in the post 11 in opposite or compensating relation to and extends parallel with the element 19, the ends of the composite elements 22 and 19 farthest from the post 11 being connected together by a member 23, which is here shown formed of a pair of thin plates of insulating material. These are placed at either side of the ends of the elements 19 and 22 farthest from the post 11 and are secured thereto by rivets 24. In this way, the flexing of the element 19 due to changes in temperature of the surrounding atmosphere will be opposed by a corresponding tendency of the similar element 22 to flex in the opposite direction.

A pin 25 which is provided with a longitudinally arranged fin 26 is secured to the insulating member 23, the fin 26 being arranged between and riveted to the insulating plates.

A suitable indicator or recording arm 28 is secured to the upper end of the pin 25 and extends over the graphic record sheet 29 which is rotatably mounted upon the supporting plate 30 carried by the posts 31. Suitable adjustment of the indicator arm relative to the record sheet may be effected by rotating the post 11 about its axis in the manner previously defined.

The element 19 is electrically insulated from the post 11, preferably by means of a very thin strip 19' of mica or other suitable heat-conducting electrical insulation medium while the element 22 may be in direct metallic contact so that both the element 19 and the element 22 will have a substantial heat interchange or thermal contact with the post.

This close thermal association between the elements and the extremely small mass of metal and the short length of the heat responsive element renders the time period of response to the heating effect of the current very short and ensures remarkable efficiency.

The post 11 with its attached thermal and equalizing elements 19 and 22 respectively and the electrical connection between the resistance element 19 and the terminals of the branch 10 from the secondary coil S of the transformer are enclosed within a casing 32 which is held in position by pins 33 arranged at opposite corners, and a cover 34 is removably secured on the top of said casing by the screws 35.

The post adjusting spindle 16 extends through an opening in the cover 34 to be readily accessible and by turning same a rotative adjustment of the post 11 may be made at any time so that the indicator or recording arm 28 may be set to any desired initial point relative to the graphic record sheet 29.

A slot 36 is formed in the cover through which the upper end of the pin 25 extends so that the record arm 28 extends from the top of the casing over the record disc.

The post 9' is connected by a bridge wire 37 to a post 38 mounted on the base and a link 39 is arranged to bridge the posts 9' and 10' or 8 and 10', as may be desired, said link having a slot at one end and a hooked formation at the other, permitting it to be quickly loosened and readjusted to connect either set of posts.

The post 9 is connected to the branch lead 10 from the transformer and when the device is used as an ammeter the post 9 is connected with the post 38 by means of a shunt 41 and the link 39 is swung to the dotted line position of Figure 5 to connect 9' and 10'. The terminals 9 and 38 are then connected in series with the circuit, the current of which is to be measured.

When the device is used as a voltmeter the post 10' is connected to the post 8 by the link 39 thereby connecting the bi-metallic element 19 with the secondary coil of the transformer, the primary of which is energized by the line voltage connected to posts 4 and 5. The current flowing through the element 19 will be proportional to the voltage applied. The bifilar resistor 7 which is in series with the element 19 provides a means of adjusting the current flowing through the element 19 thereby enabling accurate calibration.

When it is desired to use the device as a watt meter the secondary coil S of the transformer will be connected at its mid-point by a lead 43 connected to the post 38 and the mid-point 44 of the resistance element 19 will be connected to the post 9 as is shown in Figure 6.

It will be understood from this description that the resistance element 19 will flex in one direction as a direct result of the heating effect of the passage of the electric current therethrough.

A portion of the heat generated in the bi-metallic resistance 19 will be transmitted to the post 11 due to the thermal connection between these elements and this heat travelling along the post will tend to raise the temperature of the opposing bi-metallic element 22 so that it will tend to flex in opposition to the element 19 connected therewith. However the element 19 being the actual heat generator its temperature will be proportionately higher than that of the element 22 due to conduction, and consequently the greater flexing force of the element 19 will overcome the relatively feeble flexing force of the element 22 so that the pin 25 and consequently the indicator or recording arm 28 will be carried over the surface of the record sheet a proportional distance.

In this way the movement of the arm 28 represents the difference between the flexing forces of the elements 19 and 22 and a positive movement in response to the flow of current in element 19 will be obtained while at the same time rapid or extreme fluctuations will be absent due to the influential relation of the elements 19 and 22 to each other.

It will be further evident that due to the masses and dissipating surfaces represented by the active elements 19 and 20 and the post to which they are thermally attached, the immediate effect of change of current is not reflected in the instant movement of the indicator, with the result that there is a damping out of transient changes in the quantity being measured.

It will be readily appreciated that a meter constructed as herein described is extremely simple to make. It has a wide range of adjustment and can be readily adapted to operate either as a volt meter, an ammeter or as a watt meter.

What I claim as my invention is:—

1. In an electric meter, a post adapted to be rotatably mounted, a pair of bi-metallic members rigidly secured at one end in thermal contact with said post and exteding in a common direction outwardly from the post in parallel relation, the metallic elements of said bi-metallic members being arranged in opposed relation, and an insulating member rigidly connecting the outward ends of said members and adapted for connection to a recording device.

2. In an electric meter, a vertical post, a plurality of loops of thin bi-metallic material adapted to have an electric current circulated in series therethrough and having their open ends rigidly secured to said post with the loops arranged in parallel relation, a plurality of bi-metallic loops thermally secured in said post in parallel arrangement and in a substantially common plane with the aforesaid loops, a pair of strips of insulating material arranged on opposite sides of and confining the looped ends of said bi-metallic strips, rivets extending through said insulating members and through the loops of said strips, and a pin having a feather strip extending therefrom inserted between said insulating strips and rigidly secured therebetween and adapted to have a marking device mounted thereon.

3. In an electric meter, the combination of a bi-metallic resistance element adapted to conduct a flow of electric current and to have a recording means operatively connected therewith, and thermally affected means having a thermal connection with said bi-metallic resistance and oppositionally connected therewith to influence the same in substantial proportion to the heat conduction therefrom through the thermal connection and additionally acting to offset changes in ambient temperature said thermal connection comprising a substantial mass of metal acting to "dampen out" the undesirable instant fluctuations of the recording means due to transient changes in the quantity being measured.

4. In an electric meter, a rigid thermal conductor, a bi-metallic resistance element mounted on said thermal conductor, said element being thermally connected with and electrically insulated from said rigid thermal conductor and being adapted to conduct a flow of electric current and to have a recording means operatively connected therewith, and thermally affected means influentially connected with said bi-metallic member at a point spaced from the thermal conductor and thermally secured to said thermal conductor to be influenced by the heat of conduction from the bi-metallic resistance through said rigid thermal conductor said thermal conductor representing a substantial mass of metal to act as an efficient "damping out" influence to minimize instant fluctuations of the recording means due to transient changes in the quantity being measured.

5. In an electric meter, a divided metal post, a bi-metallic resistance element secured in substantially flat strip form at one end between the divided portions of said post and extending laterally in angular relation to the post, a bi-metallic element corresponding to the aforesaid element also secured between the divided portions of said post in opposed relation to the resistance element extending beyond the post in the same direction and coupled at its outward end to the outward end of the other element, the outward coupled ends of said bi-metallic members being adapted for connection with a recording means.

6. In an electric meter, a metal post, a plurality of metallic loops each having terminal ends rigidly secured to said post, all of said loops being extended angularly from said post and disposed edge-to-edge in a substantially common plane with the looped ends disposed well beyond the post, the looped end of said members being adapted for connection to a recording means, certain of said bi-metallic members being electrically insulated from the post and the others being rigidly thermally secured to said post and operating in an opposed direction to the other bi-metallic members, and means influentially linking outward looped ends of all of said bi-metallic members together to offset changes in ambient temperature, said electrically insulated bi-metallic members being adapted to be heated by the flow of an electric current.

7. Means as claimed in claim 5 in which said divided metal post comprises a pair of bars between which the ends of the bi-metallic elements are inserted, clamping screws being provided for drawing said bars into rigid clamping relation with the inserted bi-metallic members.

LOUIS A. PAINE.